(12) United States Patent
Hedrington et al.

(10) Patent No.: US 10,849,342 B2
(45) Date of Patent: Dec. 1, 2020

(54) ELECTRIC PRESSURE CANNER WITH DIGITAL CONTROL

(71) Applicant: National Presto Industries, Inc., Eau Claire, WI (US)

(72) Inventors: James A. Hedrington, Chippewa Falls, WI (US); Julian Warwick, Jim Falls, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 53 days.

(21) Appl. No.: 16/160,459

(22) Filed: Oct. 15, 2018

(65) Prior Publication Data
US 2019/0110503 A1  Apr. 18, 2019

Related U.S. Application Data

(60) Provisional application No. 62/572,080, filed on Oct. 13, 2017.

(51) Int. Cl.
*A23L 3/10* (2006.01)
*A23L 3/015* (2006.01)
(Continued)

(52) U.S. Cl.
CPC .............. *A23L 3/10* (2013.01); *A23B 4/0056* (2013.01); *A23B 7/0056* (2013.01); *A23L 3/003* (2013.01);
(Continued)

(58) Field of Classification Search
CPC . A23L 3/10–3/14; A23L 3/015–3/0155; A23L 3/003; A23L 3/001; B65B 25/001;
(Continued)

(56) References Cited

U.S. PATENT DOCUMENTS 2,620,086 A * 12/1952 Schweiso .............. A47J 27/092
                                                       220/203.29
3,559,839 A *  2/1971 Seethaler .............. A47J 27/092
                                                       220/201
(Continued)

FOREIGN PATENT DOCUMENTS

CN         105775184        7/2016
WO    WO 2016/077284 A1    5/2016

OTHER PUBLICATIONS

PCT International Search Report for International Application No. PCT/US18/55851, dated Dec. 31, 2018, 6 pages.

*Primary Examiner* — Drew E Becker

(57) ABSTRACT

A digital pressure canner and related methods of operation that provide for improved safety and consistency during a food canning process by reducing temperature over and undershoot. The digital pressure canner includes a digital control operating with inputs from digital sensors to accurately control the canning temperature during the canning process. By reducing over and undershoot of canning temperatures, foods within the pressure canner are maintained at temperatures sufficient to kill any bacteria or microorganisms for the entire canning cycle. In order to verify operation of the digital canner at sufficient canning temperatures, mechanical safety devices, for example, a pressure relief valve can be utilized in conjunction with digital controllers and sensors to provide audible and visual feedback to a user during the canning process.

15 Claims, 7 Drawing Sheets

(51) Int. Cl.
*B65B 25/00* (2006.01)
*A23L 3/00* (2006.01)
*A23B 7/005* (2006.01)
*A47J 27/09* (2006.01)
*B65B 25/06* (2006.01)
*A47J 27/08* (2006.01)
*B65B 25/04* (2006.01)
*B65B 31/02* (2006.01)
*A47J 27/086* (2006.01)
*A23B 4/005* (2006.01)

(52) U.S. Cl.
CPC .............. *A23L 3/015* (2013.01); *A23L 3/0155* (2013.01); *A47J 27/08* (2013.01); *A47J 27/0802* (2013.01); *A47J 27/086* (2013.01); *A47J 27/09* (2013.01); *B65B 25/001* (2013.01); *B65B 25/041* (2013.01); *B65B 25/062* (2013.01); *B65B 25/067* (2013.01); *B65B 31/025* (2013.01)

(58) Field of Classification Search
CPC ..... B65B 31/02–31/028; B65B 25/041; B65B 25/062; B65B 25/067; A23V 2002/00; A47J 27/004; A47J 27/04; A47J 2027/043; A47J 27/08–27/092; A47J 2202/00; A23B 4/0056; A23B 7/0056
USPC ....... 426/397, 403, 407, 412, 231–233, 524; 99/359–371
See application file for complete search history.

(56) References Cited

U.S. PATENT DOCUMENTS

| | | | |
|---|---|---|---|
| 3,875,854 A | 4/1975 | Wassenaar | |
| 4,330,069 A * | 5/1982 | Bauer | A47J 27/09 220/203.18 |
| 4,847,099 A * | 7/1989 | Elinsky | A47J 27/00 426/233 |
| 4,911,068 A * | 3/1990 | Koether | A47J 27/0817 99/325 |
| 5,160,755 A | 11/1992 | Mignogna et al. | |
| 5,269,336 A * | 12/1993 | Subramanian | A47J 27/09 137/73 |
| 5,567,458 A * | 10/1996 | Wu | A47J 27/004 219/433 |
| 5,771,783 A * | 6/1998 | Uss | A47J 27/212 16/433 |
| 6,018,150 A * | 1/2000 | Maher, Jr. | G05D 23/1913 219/441 |
| 6,083,543 A * | 7/2000 | Kim | A47J 36/32 426/231 |
| 6,158,606 A * | 12/2000 | Oliver | A47J 27/09 126/388.1 |
| 6,903,310 B1 * | 6/2005 | Lee, Jr. | A47J 27/04 219/490 |
| 2002/0050211 A1 * | 5/2002 | Ng | A47J 27/0802 99/331 |
| 2005/0028678 A1 * | 2/2005 | Baraille | A47J 27/0802 99/331 |
| 2011/0127342 A1 * | 6/2011 | Bauchot | G05D 23/27543 236/46 A |
| 2012/0012010 A1 * | 1/2012 | Baraille | A47J 27/09 99/325 |
| 2012/0288595 A1 * | 11/2012 | Randall | H05B 1/0266 426/231 |
| 2013/0199635 A1 * | 8/2013 | Hasegawa | A47J 27/09 137/535 |
| 2014/0348987 A1 * | 11/2014 | Cheng | A47J 27/04 426/231 |
| 2016/0007644 A1 * | 1/2016 | Hack | A47J 27/04 99/333 |
| 2016/0198883 A1 * | 7/2016 | Wang | A23L 5/10 426/231 |
| 2019/0014943 A1 * | 1/2019 | Gill | A23L 5/15 |

* cited by examiner

ELECTRIC PRESSURE CANNER WITH DIGITAL CONTROL

CROSS-REFERENCE TO RELATED APPLICATION

The present application claims the benefit of U.S. Provisional Application No. 62/572,080, filed Oct. 13, 2017, which is hereby incorporated herein in its entirety by reference.

TECHNICAL FIELD

The present invention is directed to pressure canner appliances. More specifically, the present invention is directed to a digital pressure canner appliance that uses a non-contact thermal sensor to digitally measure internal steam temperature and control the application of heat to the pressure canner appliance so as to avoid large variation in internal temperature during the canning process.

BACKGROUND

Residential canner appliances are well known and are frequently used to prepare food recipes in jars. Canner appliances are used to preserve food products in a jar for up to 1 year by sterilizing the contents, removing oxygen from the food product and jar, and sealing the jar. Traditionally, two types of canning methods exist, water bath canning and pressure canning. Water bath canning is the relatively lower-temperature canning process typically used for high-acid foods including fruits and fruit juices, jams, jellies, salsas, tomato sauces, pickled foods, vinegars, and condiments. The high acidity of the foods kills the bacteria and microorganisms. Pressure canning is performed at a relatively higher temperature (240° F.) and pressure, and is used for low-acid foods including vegetables, meats, poultry, and seafood. The high internal temperature kills the bacteria and microorganisms. As such, the achievement and maintenance of temperature high enough to ensure that the bacteria and microorganisms are killed is of paramount importance.

In operation, traditional pressure canners are filled with the jar-food to be sterilized and a small amount of water. Once the lid has been fixedly attached to the vessel, the vessel is placed on a heat source such as, for example, a stove top, wherein the heat source is set at a maximum output level. As the vessel is heated, the water begins to boil, which turns to steam and the pressure within the vessel begins to rise. The lid can include a mechanical pressure relief, for example, a weighted rocker or spring-based relief valve that begins to release pressure/steam above a desired setpoint. It is this relief of pressure, and the corresponding rocking motion and whistling noise that indicates to a user that the appropriate temperature and pressure has been achieved for sterilization and timing of the canning process can commence.

While the mechanical pressure relief performs its basic function, it can result in a very inefficient canning process. For instance, once satisfactory pressure is reached, there is no longer the necessity for the heat source to be set at the maximum level. However, the user has no reliable control feedback regarding the heat source other than the motion, noise and steam associated with the rocker and spring-based relief valves. In some instances, the noise may be so significant that the user reduces the heat source so much that the relief valves are no longer venting, which is an indication that pressure is no longer satisfactory and a potentially dangerous canning situation is occurring.

While prior digital canner appliances exist that are capable of water bath canning, the National Center for Home Food Preservation (funded by the USDA) has warned against using digital canner appliances for pressure canning. The main concern with digital pressure canner appliances regards the temperature for the preservation and sterilization of the food product. The temperature in prior digital pressure canner appliances tends to fluctuate due to the mounting location of the heat sensor. Typically, the heat sensor is located on a canner floor or bottom and measures the temperature of the canner material as opposed to an internal steam temperature within the pressure canner. As the canner material functions as a large heat sink, the heat sensor is not exposed to real-time temperature conditions within the pressure canner and to which the food is actually exposed. As such, the temperature sensed by the heat sensor will always be lagging or leading with respect to the internal temperature conditions resulting in a heating element not being operated in the most efficient and desirable fashion. As such, large under and overshoots can be experienced with respect to internal canner temperature, which can potentially allow bacteria and microorganisms to survive the canning process and lead to food spoilage.

As such, it would be advantageous to have a digital pressure canner appliance that is able to sense steam temperature in a real-time environment so as to ensure effective and safe pressure canning of food products.

SUMMARY

A digital pressure canner of the present invention can provide for improved safety and consistency by reducing over and undershoot with respect to temperature control for a canning process. By reducing over and undershoot of internal canning temperatures, foods within the pressure canner are consistently maintained at the temperatures necessary to kill any bacteria or microorganisms throughout the entire canning cycle. Embodiments of the digital pressure canner include a temperature sensor adapted to measure an internal steam temperature within the pressure canner itself and to communicate the internal steam temperature in real-time to a temperature control. By measuring internal steam temperature in real-time, the temperature control is able to control a heating element in conjunction with actual conditions inside the pressure canner and avoid temperature over and undershoot within the pressure canner. In some embodiments, mechanical safety device, for example, a pressure relief valve can be utilized in conjunction with digital controllers and sensors to provide audible or physical indications that sufficient canning temperatures have been achieved.

In one aspect, the present invention is directed to a pressure canner that utilizes a digital controller and a digital sensor to reduce temperature over and undershoot during a canning cycle. The digital sensor is configured such that a sensing element is exposed to an interior canning environment within the pressure canner such that real-time steam temperature is communicated to the digital controller.

In another aspect, the present invention is directed to a method of canning food wherein a canning temperature is controlled with a digital controller and related digital sensors so as to reduce any temperature over or undershoot during a canning cycle. The method can comprise positioning a sensing element within an interior canning volume of a pressure canner such that real-time steam temperatures are communicated to the digital controller for selectively operating a heating element.

The above summary is not intended to describe each illustrated embodiment or every implementation of the subject matter hereof. The figures and the detailed description that follow more particularly exemplify various embodiments.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
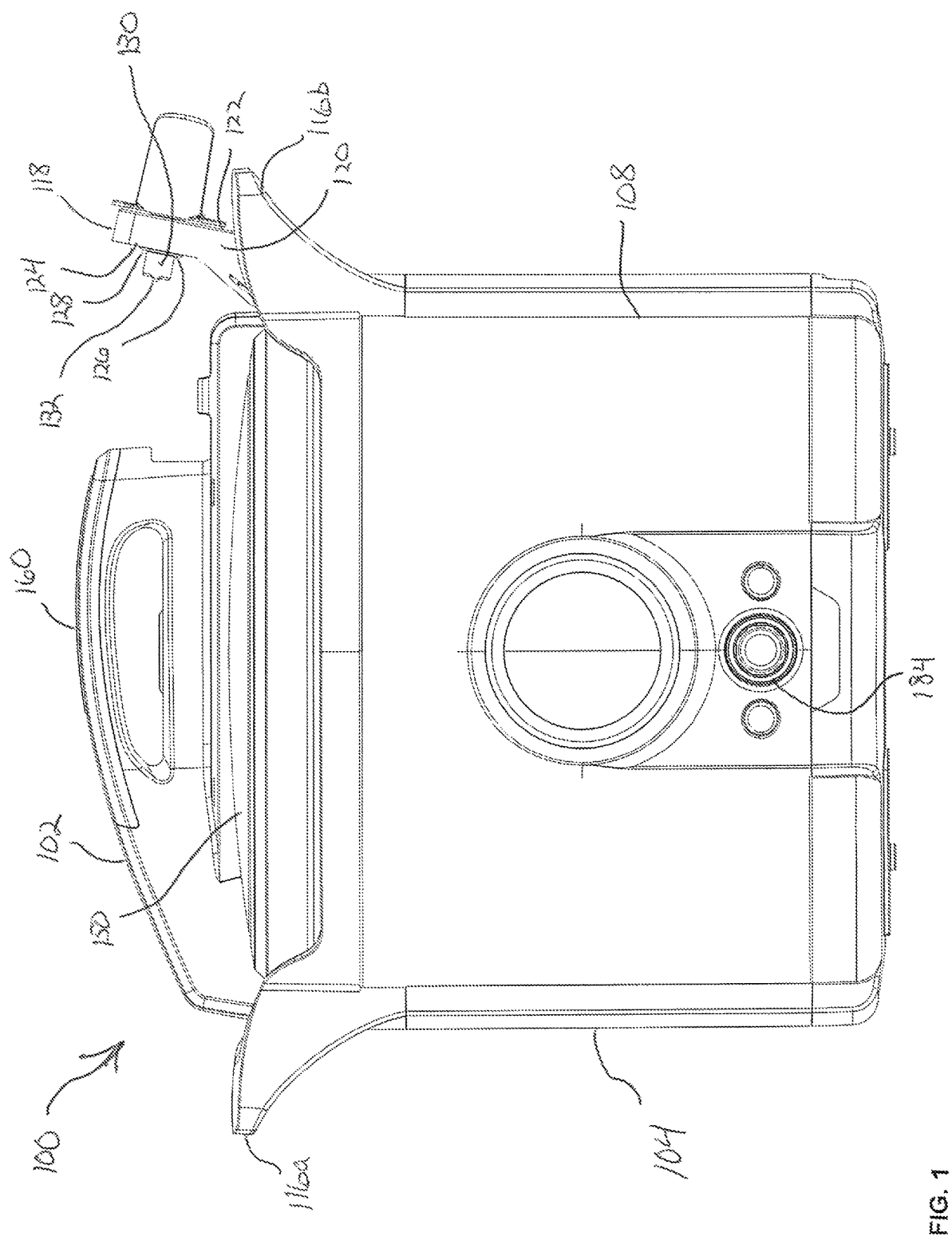
FIG. 1 is a front view of a pressure canner according to a representative embodiment of the present invention.
Figure 2:
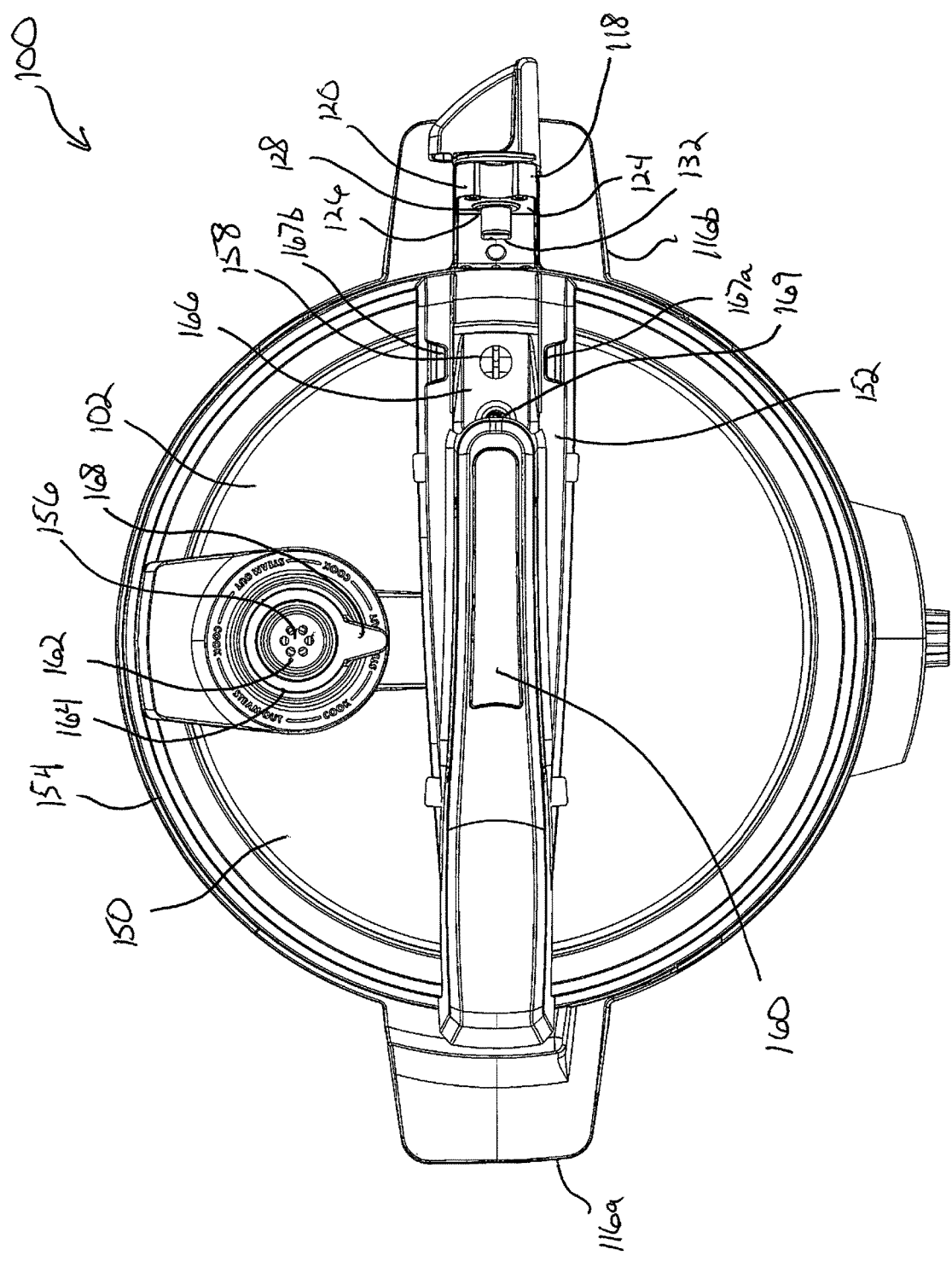
FIG. 2 is a top view of the pressure canner of FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

A representative embodiment of a pressure canner 100 of the present invention is illustrated within FIGS. 1-4 and 7. Generally, pressure canner 100 comprises a lid assembly 102 and a vessel body 104. Though not illustrated in FIG. 1, it will be understood by one of ordinary skill in the art that lid assembly 102 and vessel body 104 can be operably locked together with conventional interlock features to form a vessel capable of safely operating at internal pressures exceeding at least 10 psig. For example, lid assembly 102 and vessel body 104 can make use of a plurality of recesses 103 and tabs 105 that cooperate to allow the lid assembly 102 to be placed onto the vessel body 104 and rotated into a captured or locked position as commonly found in conventional pressure canner designs. Pressure canner 100 is generally fabricated of materials suitable for repeated exposure to elevated temperatures and pressure and that can be cleaned and sanitized with conventional cleaning materials.

As illustrated in FIGS. 1-7, vessel body 104 is generally defined by an internal pressure vessel 106 and an external shell 108. Internal pressure vessel 106 defines an upper opening 110, an inner sidewall 112 and a vessel floor 114. External shell 108 includes a pair of opposed handles 116a, 116b. Opposed handle 116b can include a rotating sensor mount 118. Rotating sensor mount 118 can comprise a mount body 120 defined by an upper mounting surface 122 and a lower mounting surface 124. The lower mounting surface 124 can define a sensor mounting bore 126 that is surrounded by a lower sealing member 128. A digital pressure sensor 130 can be mounted within the sensor mounting bore 126 such that a sensor probe 132 extends outward and away from the lower mounting surface 124. The digital pressure sensor 130 can comprise a sensor wire (not shown) that extends outward of the mount body 120. Upper mounting surface 122 can comprise a latch member 136 rotatably coupled to the upper mounting surface 122. Latch member 136 can comprise an elongated latch body 138 having a pair of latch ends 140a, 140b.

Referring again to FIGS. 1-7, lid assembly 102, generally comprises an upper cover surface 150 including an upper mount member 152. Upper surface 150 generally defines a lid perimeter 154 such that the lid assembly 102 can sealably coupled to the internal pressure vessel 106, and thereby allow for the operation of pressure canner 100 above atmospheric pressure through the interaction of recesses 103 and tabs 105. Upper surface 150 can include a relief bore 156 and a sensor bore 158. Upper mount member 152 generally extends across the upper surface 150 and can comprise a lid handle member 160. Upper surface 150 can further include a relief aperture 162 in communication with the relief bore 156 and wherein the relief aperture 162 further define a relief mounting surface 164. In addition, upper mount member 152 can define a sensor channel 166 such that the sensor bore 158 is exposed and accessible. Proximate the sensor channel 166 is a pair of projections 167a, 167b on either side of the sensor channel 166 with each projection 167a, 167b configured to receive the corresponding latch end 140a, 140b. Sensor channel 166 can further comprise a locking pin 169 located proximate the projections 167a, 167b. Locking pin 169 generally comprises an elongated member 171 that sealably extends through a pin aperture 175 through the upper cover surface 150 and terminates at a bottom pin surface 173. Lid assembly 102 can further include a pressure relief valve 168 which is operably coupled to the relief mounting surface 164 such that the pressure relief valve 168 is in communication with the internal pressure vessel 106 through the relief bore 156 and relief aperture 162 when the lid assembly 102 is operatively coupled to the vessel body 104.

Figure 8:
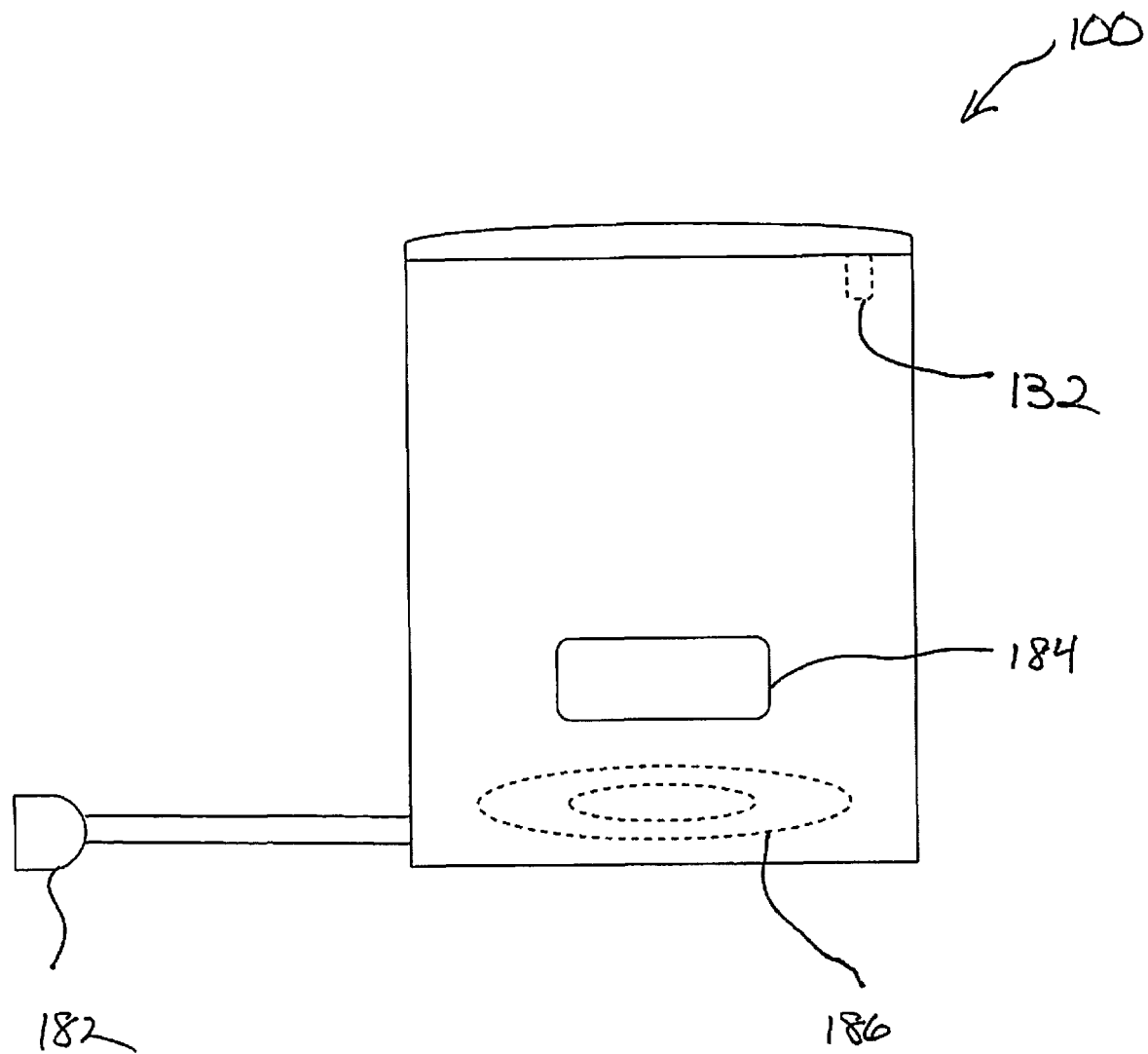
FIG. 8 is a schematic illustration of an operations circuit of the pressure canner of FIG. 1.

Pressure canner 100 further comprises an operations circuit shown schematically in FIG. 8. The operations circuit generally comprises a power source 182, a digital controller 184 and a heating element 186. Power source 182 generally comprises a standard cord and plug assembly for electrically connecting the pressure canner 100 to a standard electrical outlet. With power source 182 connected to an electrical outlet, digital controller 184 can be turned on and begin providing control of the heating element 186. Generally, digital controller 184 will include a number of stored programs or "recipes" that correspond to certain foods to be pressure canned. These programs or recipes can include desired temperatures and times necessary to safely and successfully can various food types. In some instances, pressure canner 100 can further comprise a display element and/or buttons, whereby a user can interface with the digital controller 184 to select food types to be canned or to alternatively, operate the pressure canner 100 manually.

Figure 3:
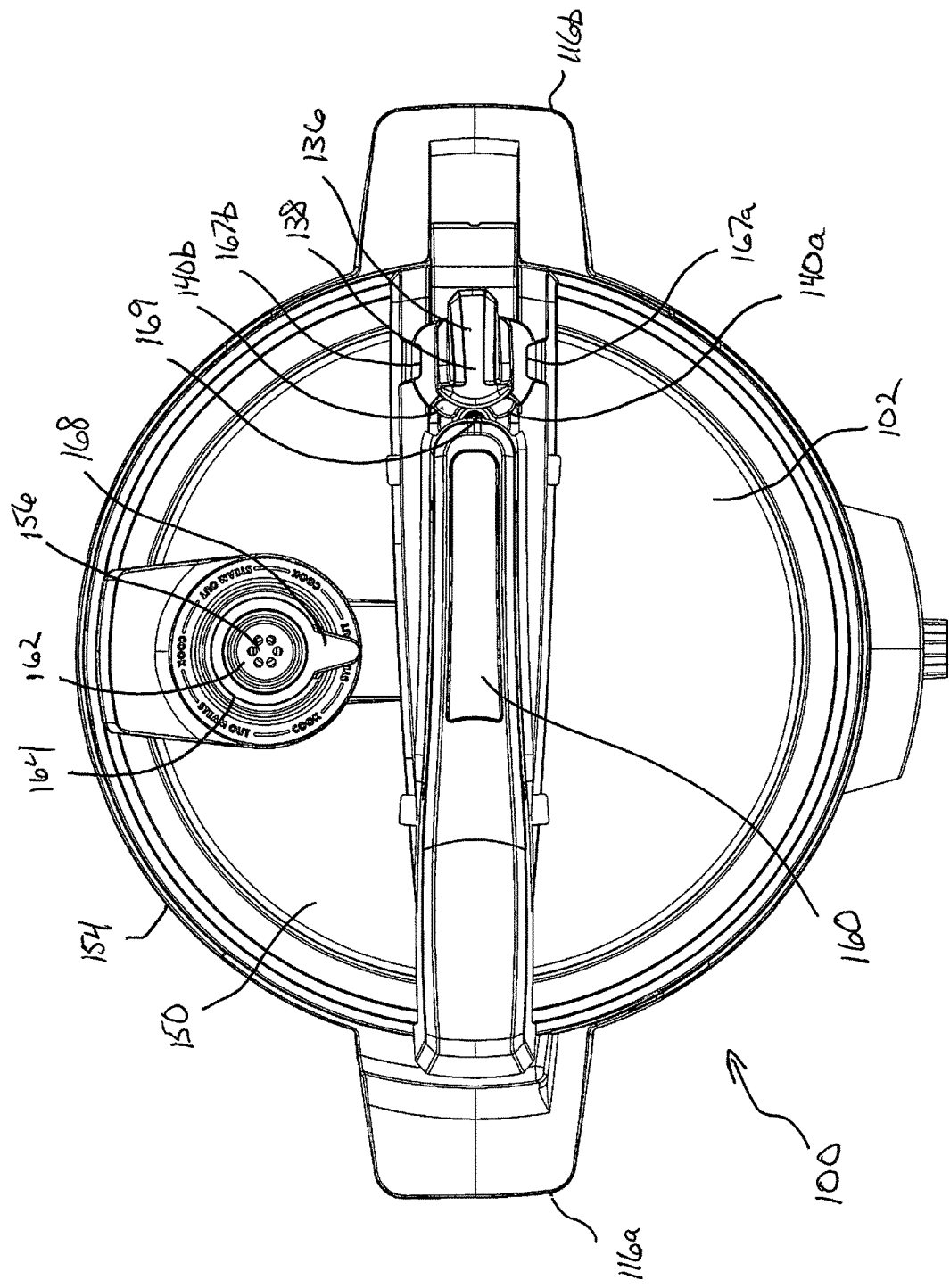
FIG. 3 is a top view of the pressure canner of FIG. 1.
Figure 5:
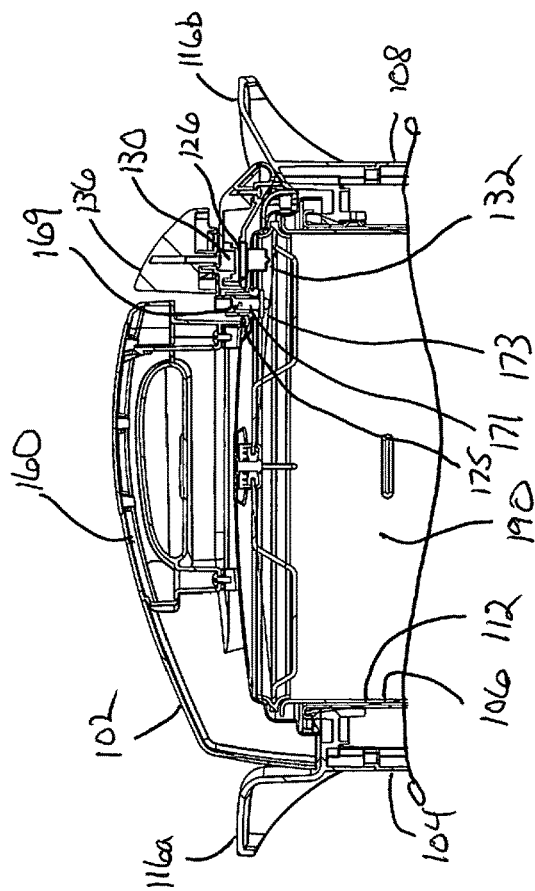
FIG. 5 is a section view of the pressure canner of FIG. 1 taken at line B-B of FIG. 4.
Figure 4:
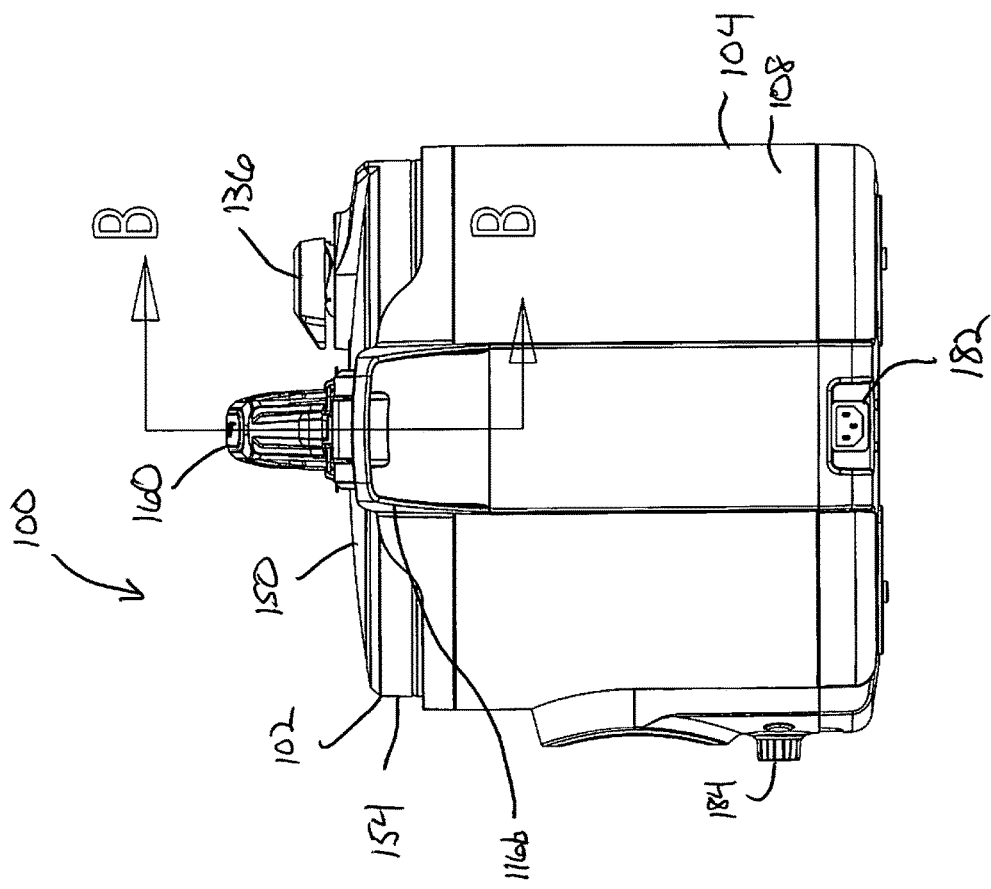
FIG. 4 is a side view of the pressure canner of FIG. 1.
Figure 6:
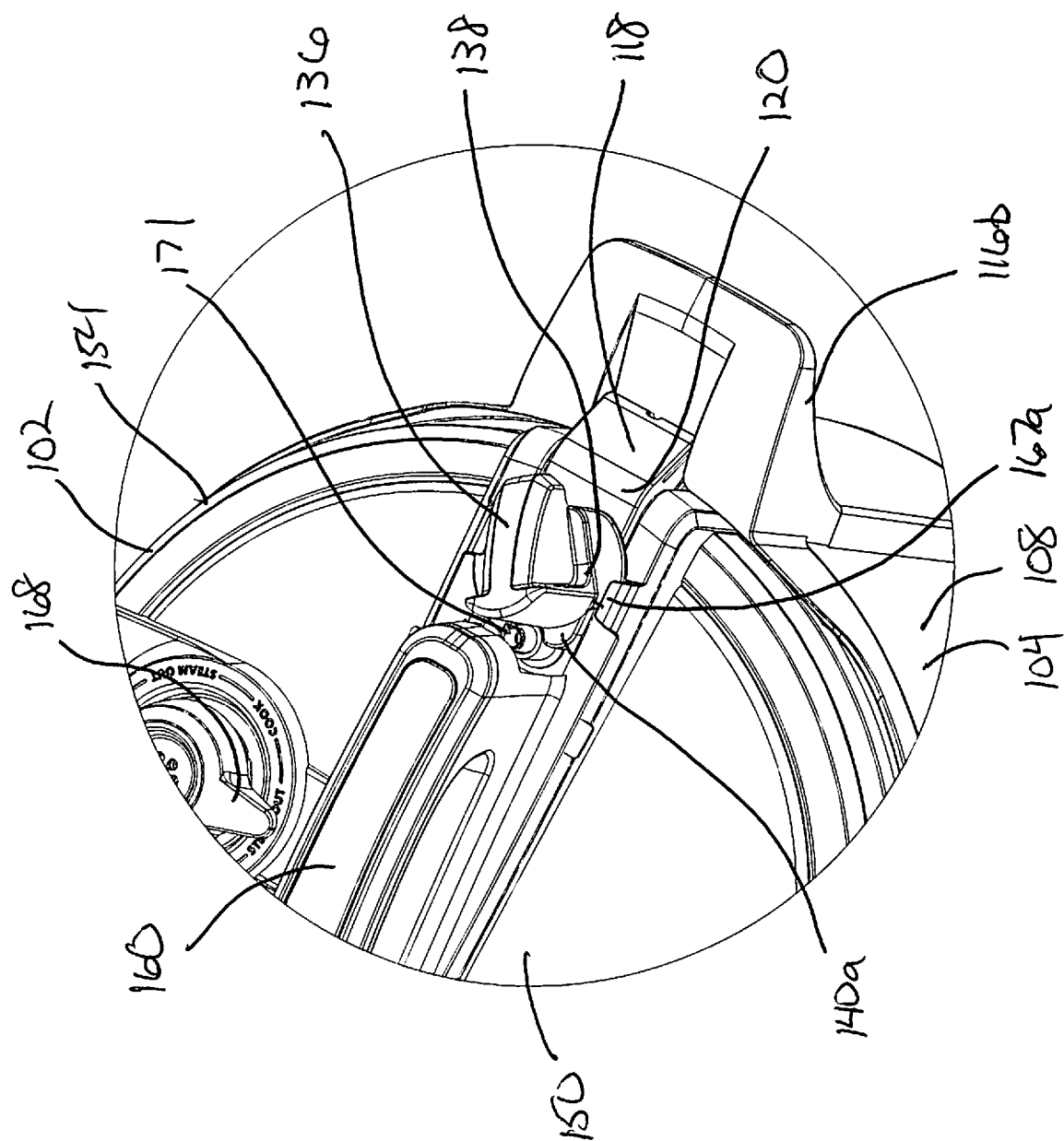
FIG. 6 is a detailed top, perspective view of the pressure canner of FIG. 1.
Figure 7:
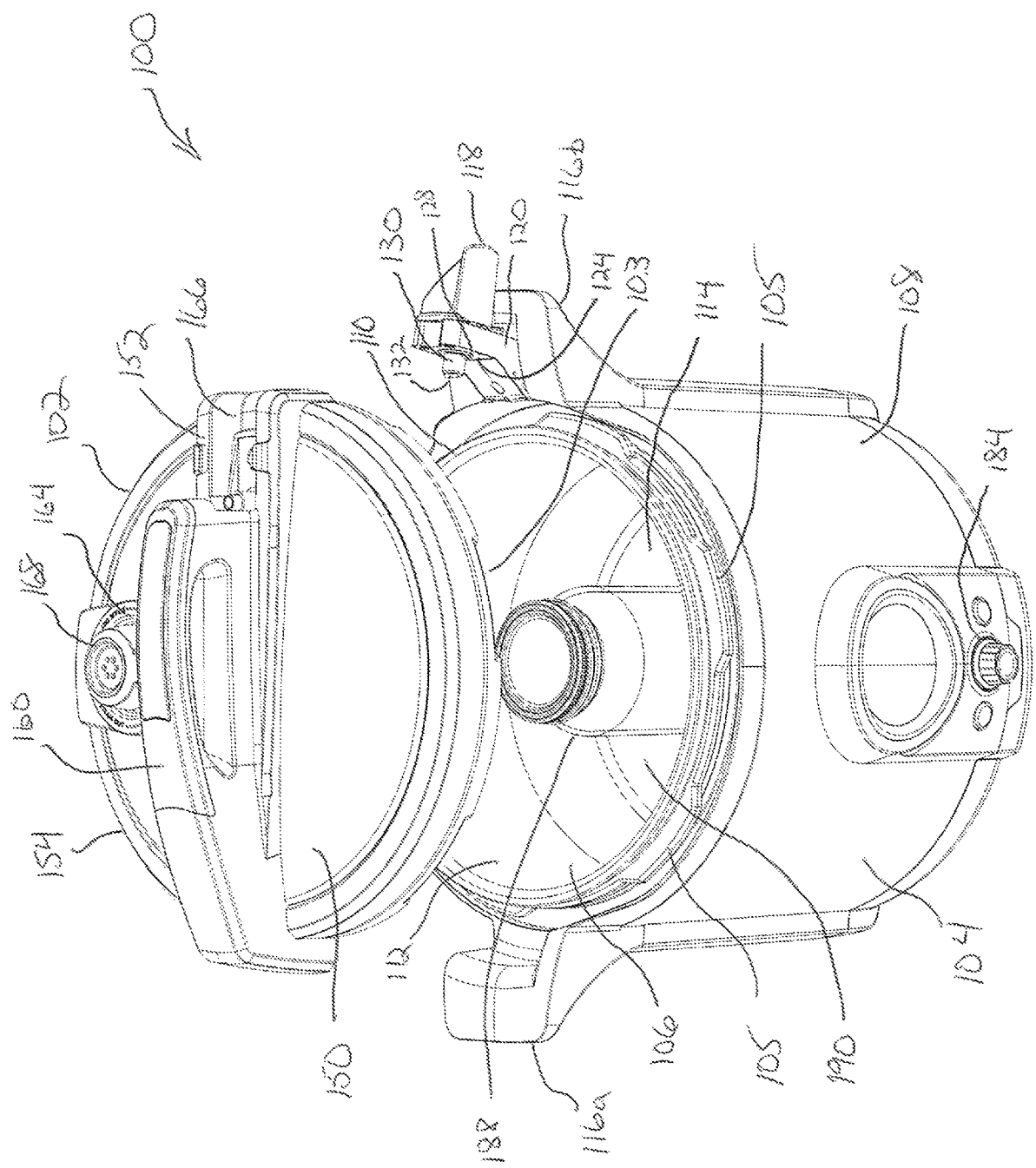
FIG. 7 is an exploded, top perspective view of the pressure canner of FIG. 1.

In operation, a jar, for example, a mason jar 188 filled with food to be canned is placed on the vessel floor 114 within the vessel body 104 as shown in FIG. 7. The lid assembly 102 is securely coupled to the vessel body 104 to define an interior pressurized canning area 190 as shown in FIGS. 5 and 7. With the lid assembly 102 secured over the upper opening 110 with recesses 103 and tabs 105, the mount body 120 of the rotating sensor mount 118 can be rotated such that the mount body 120 is positioned within the sensor channel 166 as shown in FIGS. 3-6. With the lower mounting surface 124 positioned proximate the upper cover surface 150, the sensor probe 132 is directed into and through the sensor bore 158 such that the sensor probe 132 is exposed to the inner pressure vessel 106 and the interior pressurized canning area 190 specifically. Latch member 136 can be rotated such that the latch ends 140a, 140b securely engage the projections 167a, 167b and lower sealing member 128 can engage and seal the sensor bore 158 as shown in FIGS. 3 and 6. Preferably, the sensor probe 132 is exposed to the interior pressurized canning area 190 defined within the inner pressure vessel 106 in a non-contact manner, wherein the sensor probe 132 is not in physical contact with the material that comprises the inner pressure vessel 106 or lid assembly 102 such that any heat sink impact of these materials is avoided and to eliminate leading or lagging temperature readings as found in conventional canners.

With the pressure canner 100 assembled and the mason jar 188 positioned within the interior pressurized canning area 190, digital controller 184 will receive manual or "recipe" instructions requesting operation at a desired temperature and pressure. Generally, the digital controller 184 will allow power to the heating element 186, whereby the internal temperature will begin to rise in the internal pressure vessel 106 and the interior pressurized canning area 190. The steam temperature and pressure within the internal pressure vessel 106 and the interior pressurized canning area 190 will be sensed by the sensor probe 132 that is in communication with the interior of the interior pressure vessel 106 through its positioning through the sensor bore 158. As the sensor probe 132 is sensing and communicating the real-temperature conditions within the interior pressurized canning area 190 to the digital controller 184, the typical temperature over and undershoot that is experienced with measuring temperature on a canner floor or surface and the corresponding lag with respect to real time conditions is avoided. By avoiding the initial temperature overshoot during initial heating, the digital controller 184 also avoids the subsequent temperature "undershoot" that occurs when a conventionally located temperature senor finally transmits a temperature to the controller that the temperature setpoint has been achieved. Through the exposure of the sensor probe 132 to the actual steam temperature within the interior pressure vessel 106 and the interior pressurized canning area 190 specifically and the corresponding real-time measurements provided to the digital controller 184, the desired and targeted temperature setpoint is maintained without the cyclic overshoot/ undershoot of conventional pressure canners utilizing conventional temperature measurement of canner surfaces. As such, the food being canned within the pressure canner 100 is maintained at the necessary temperature for sufficient periods to kill any bacteria and microorganisms. Furthermore, the digital controller 184 can maintain sufficient temperature such that the pressure relief valve 168 is either not venting or only minimally venting so as to indicate more efficient operation of the pressure canner 100 throughout the canning process.

During canning, the pressure experienced within the internal pressure vessel 106 biases the bottom pin surface 173 such that the elongated member 171 is lifted and the locking pin 169 is exposed in the sensor channel 166 as shown in FIG. 6. With the locking pin 169 lifted and physically elevated above the surface of the sensor channel 166, rotation of the latch member 136 is prevented as the latch ends 140a, 140b physically contact the locking pin 169. As such, the locking pin 169 ensures that the latch ends 140a, 140b remain securely engaged with the projections 167a, 167b and rotating sensor mount 118 is retained such that the sensor probe 132 remains within and exposed to the interior pressurized canning area 190 during canning. Only when pressure has been removed, for example, by venting the interior pressurized canning area 190, does the elongated member 171 drop down such that the locking pin 169 is below the sensor channel 166 and the latch member 136 can be rotated to unlock the rotating sensor mount 118.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A digital pressure canner, comprising: a vessel body; a lid assembly mechanically coupled to the vessel body so as to define a pressurized canning area; and a control circuit including a digital sensor probe and a digital controller operably connected to a heater assembly, wherein the digital sensor probe extends through the lid assembly such that the sensor probe is exposed to the pressurized canning area to measure a real-time internal canning temperature, the digital sensor probe communicating the real-time internal canning temperature to the digital controller, which subsequently varies a power output to the heater assembly, the digital sensor probe being mounted in a rotatable sensor mount that is rotatably connected to the vessel body.

2. The digital pressure of claim 1, wherein the lid assembly further comprises a sensor channel defining a sensor bore and wherein the rotatable sensor mount is rotatably mounted such that rotation of the rotatable sensor mount directs the digital sensor probe through the sensor bore.

3. The digital pressure canner of claim 2, wherein the rotatable sensor mount further comprises a sealing member for sealably engaging the sensor bore when the digital sensor probe is directed through the sensor bore.

4. The digital pressure canner of claim 3, wherein the rotatable sensor mount further comprises a latch member, said latch member physically engaging a pair of projections on the sensor channel to secure the rotatable sensor mount relative to the sensor channel when the digital sensor probe is directed through the sensor bore.

5. The digital pressure canner of claim 4, wherein the sensor channel includes a locking pin that is elevated above the sensor channel when the pressurized canning area is pressurized such that the latch member cannot be disengaged from the pair of projection when the pressurized canning area is pressurized.

6. The digital pressure canner of claim 1, wherein the lid assembly further comprises a relief bore, said relief bore in communication with the pressurized canning area and wherein a pressure relief valve is mounted within the relief bore.

7. A method of canning food with a digital pressure canner, comprising:
 mounting a digital sensor probe in a rotatable sensor mount that is rotatably connected to a vessel body of a pressurized canning vessel;
 rotating the rotatable sensor mount relative to the vessel body such that the digital sensor probe is directed through a lid assembly of the pressurized canning vessel via a sensor bore defined in the lid assembly;
 monitoring a real-time canning temperature within a pressurized canning area of the pressurized canning vessel using the digital sensor probe exposed to the pressurized canning area;
 communicating the real-time canning temperature to a digital controller operably connected to the digital sensor probe; and
 varying an output power supplied by the digital controller to a heater assembly on the pressurized canning vessel such that the real-time canning temperature is maintained at a desired canning temperature.

8. The method of claim 7, wherein the rotatable sensor mount further comprises a sensor sealing member and wherein rotating the rotatable sensor mount further comprises:
 sealing the digital sensor probe in the pressurized canning area by sealably engaging the sensor sealing member and the sensor bore.

9. The method of claim 8, wherein the rotatable sensor mount further comprises a latching member and wherein sealing the digital sensor probe in the pressurized canning area further comprises:
 engaging the latching member with a pair of engagement tabs on the lid assembly.

10. The method of claim 9, wherein a locking pin is exposed to the pressurized canning area and further comprising:
 lifting the locking pin when the pressurized canning area is under pressure, whereby the elevated locking pin prevents disengagement of the latching member from the pair of engagement tabs.

11. The method of claim 7, wherein varying the output power supplied by the digital controller to the heater assembly further comprises:
 controlling the output power such overshoot of the desired canning temperature by the real-time canning temperature is reduced.

12. The method of claim 7, wherein varying the output power supplied by the digital controller to the heater assembly further comprises:
 controlling the output power such that undershoot of the desired canning temperature by the real-time canning temperature is reduced.

13. The method of claim 7, wherein varying the output power supplied by the digital controller to the heater assembly further comprises:
 controlling the output power such overshoot of the desired canning temperature by the real-time canning temperature is reduced; and
 controlling the output power such that undershoot of the desired canning temperature by the real-time canning temperature is reduced.

14. The method of claim 7, further comprising:
 mounting a pressure relief valve in a relief bore in the pressurized canning vessel such that the pressure relief valve is in communication with the pressurized canning area of the pressurized canning vessel; and
 relieving excess pressure in the pressurized canning vessel with the pressure relief valve, said excess pressure being pressure higher than a pressure setting of the pressure relief valve.

15. The method of claim 14, wherein controlling the output power supplied by the digital controller reduces the excess pressure in the pressurized canning vessel such that undershoot of the desired canning temperature the real-time canning temperature is reduced.

* * * * *